(12) United States Patent
Raghunath

(10) Patent No.: US 9,710,429 B1
(45) Date of Patent: Jul. 18, 2017

(54) PROVIDING TEXT RESOURCES UPDATED WITH TRANSLATION INPUT FROM MULTIPLE USERS

(75) Inventor: Mandayam Thondanur Raghunath, Bangalore (IN)

(73) Assignee: GOOGLE INC., Mountain View, CA (US)

( * ) Notice: Subject to any disclaimer, the term of this patent is extended or adjusted under 35 U.S.C. 154(b) by 1050 days.

(21) Appl. No.: 12/945,312

(22) Filed: Nov. 12, 2010

(51) Int. Cl.
*G06F 17/20* (2006.01)
*G06F 17/21* (2006.01)
*G06F 17/28* (2006.01)

(52) U.S. Cl.
CPC ............ *G06F 17/20* (2013.01); *G06F 17/28* (2013.01)

(58) Field of Classification Search
USPC ....... 704/1–2, 3–10; 709/201–203, 238–244, 709/248
See application file for complete search history.

(56) References Cited

U.S. PATENT DOCUMENTS

| | | | | |
|---|---|---|---|---|
| 5,477,451 A * | 12/1995 | Brown et al. | ...................... | 704/9 |
| 5,497,319 A * | 3/1996 | Chong et al. | ...................... | 704/2 |
| 5,535,120 A * | 7/1996 | Chong et al. | ...................... | 704/3 |
| 5,642,522 A * | 6/1997 | Zaenen et al. | ................. | 715/246 |
| 5,677,835 A * | 10/1997 | Carbonell et al. | ................. | 704/8 |
| 5,903,859 A * | 5/1999 | Stone et al. | ...................... | 704/8 |
| 5,987,513 A * | 11/1999 | Prithviraj et al. | ............ | 709/223 |
| 6,278,967 B1 * | 8/2001 | Akers et al. | ...................... | 704/2 |
| 6,393,389 B1 * | 5/2002 | Chanod et al. | ................... | 704/7 |
| 7,295,963 B2 * | 11/2007 | Richardson et al. | ............. | 704/2 |
| 7,308,399 B2 * | 12/2007 | Fallen-Bailey et al. | .......... | 704/8 |
| 7,346,487 B2 * | 3/2008 | Li | ..................................... | 704/2 |
| 7,533,013 B2 * | 5/2009 | Marcu | ............................... | 704/2 |
| 8,140,322 B2 * | 3/2012 | Simonsen et al. | ................ | 704/2 |
| 8,265,923 B2 * | 9/2012 | Chatterjee et al. | ............... | 704/2 |
| 8,275,606 B2 * | 9/2012 | Sakashita et al. | ................ | 704/8 |
| 2002/0040292 A1 * | 4/2002 | Marcu | ............................... | 704/4 |
| 2002/0161569 A1 * | 10/2002 | Itoh et al. | ......................... | 704/2 |
| 2003/0040899 A1 * | 2/2003 | Ogilvie | ............................. | 704/2 |
| 2003/0046062 A1 * | 3/2003 | Cartus | ............................ | 704/10 |
| 2003/0101046 A1 * | 5/2003 | Krasnov | .......................... | 704/7 |
| 2003/0171911 A1 * | 9/2003 | Fairweather | ..................... | 704/2 |
| 2004/0102957 A1 * | 5/2004 | Levin | ................................ | 704/3 |
| 2004/0260532 A1 * | 12/2004 | Richardson et al. | ............. | 704/2 |
| 2005/0005266 A1 * | 1/2005 | Datig | ............................ | 717/136 |
| 2005/0288920 A1 * | 12/2005 | Green et al. | ...................... | 704/3 |

(Continued)

*Primary Examiner* — Pierre-Louis Desir
*Assistant Examiner* — D. Kovacek
(74) *Attorney, Agent, or Firm* — Remarck Law Group PLC

(57) ABSTRACT

Methods, systems, and apparatus, including computer programs encoded on a computer storage medium, for providing text resources updated with translation input from multiple users. In one aspect, a method includes receiving machine-translated text, which is a translation of source text in a source language, in a target language and providing the machine-translated text as a translation of the source text to multiple users. A modification of the machine-translated text by a user results in a modified translated text. It is determined that the modified translated text is an acceptable translation of the source text. Upon such determining, the modified translated text is provided as the translation of the source text to subsequent users. The modified translated text so provided is modifiable by one or more of the subsequent users.

31 Claims, 9 Drawing Sheets

(56) References Cited

U.S. PATENT DOCUMENTS

| | | | |
|---|---|---|---|
| 2007/0016401 A1* | 1/2007 | Ehsani et al. | 704/9 |
| 2008/0195372 A1* | 8/2008 | Chin et al. | 704/2 |
| 2009/0024383 A1* | 1/2009 | Shiratori | 704/4 |
| 2009/0063130 A1* | 3/2009 | Moore | 704/4 |
| 2009/0076792 A1* | 3/2009 | Lawson-Tancred | 704/2 |
| 2009/0281789 A1* | 11/2009 | Waibel et al. | 704/3 |
| 2011/0047149 A1* | 2/2011 | Vaananen | 707/723 |
| 2012/0271828 A1* | 10/2012 | Raghunath | 707/739 |

* cited by examiner

PROVIDING TEXT RESOURCES UPDATED WITH TRANSLATION INPUT FROM MULTIPLE USERS

BACKGROUND

This specification relates to providing resources that include text translated from a source language to a target language based on input from multiple users.

A website is one or more resources associated with a domain name or a family of domain names and hosted by one or more servers. Websites are owned and managed by individuals or entities, for example, publishers, advertisers, and the like. The resources in a website can include natural language text written in a source language. When a user accesses a website, using a web browser on a computer that is in communication over the Internet with the server that hosts the website, for example, the user views a resource, for example, a web page, having text in the source language. If the user is not familiar with the source language text in the resource that the user views, then the text can be translated into a target language with which the user is familiar. The translation can be performed in response to a user request, or automatically, based on user preferences, for example. The translation can be prepared by the website or by a service operating independently of the website. The translation can be presented to the user as another resource that includes the translated text in the target language. Such translations of text in a resource from a source language to a target language can be performed, for example, by machine translation systems.

SUMMARY

This specification describes technologies relating to providing text resources that can be updated with translation input from multiple users.

Machine translation systems are systems of one or more computers running machine translation software using language data to translate text from a source language into text into a target language. When text is in resources that are accessible to multiple users, some users may prefer to be presented with text in a target language that is different from the source language. For such users, a machine translation system is invoked to translate the text in the resource from the source to the target language, either in real time or in advance. The translated text can be provided to the users who prefer to receive the text in the target language.

Although the computer-generated text may be an acceptable translation of the source text, the translation may not, however, be as good in quality as text originally written in the target language by a native speaker of the target language. Facilities are provided so that a user who is familiar with the target language can improve the machine translation. For example, a user might re-arrange the form of the translated sentence or replace words to conform with target language usage or correct other translation errors.

One innovative aspect of the subject matter described in this specification can be implemented as a method performed by a computer system including one or more computers. Machine-translated text is received by the computer system. The machine-translated text is a machine translation, by a machine translation system, of source text from a source language to the target language. The machine-translated text is provided as a translation of the source text to multiple users. A modification of the provided machine-translated text is detected by a user of the multiple users. The modification results in a modified translated text. The modification includes at least one of an addition of text in the target language to the machine-translated text, a deletion of a portion of the machine-translated text, or a re-arrangement of portions of the machine-translated text. The machine translation system determines that the modified translated text is an acceptable translation of the source text. Upon determining that modified translated text is an acceptable translation of the source text, the modified translated text is provided by the computer system as the translation of the source text to subsequent users. The modified translated text is modifiable by one or more of the subsequent users.

This, and other aspects can include one or more of the following features. Determining, using the machine translation system, that the modified translated text is an acceptable translation includes generating changed text that represents a difference between the machine-translated text and the modified translated text, providing the changed text to the machine translation system, and obtaining an indication from the machine translation system that the changed text is acceptable relative to the source text. Further, the modified translated text can be tracked to determine subsequent modifications by a subsequent user to the modification made by the user. A reliability score can be associated with the user based on the tracking. Changed text, that represents a difference between the machine-translated text and the modified translated text, can be generated. It can be determined that the user from whom the modification was received is associated with a reliability score that is greater than a threshold. The changed text can be provided to the machine translation system to use as training data. It can be determined that a modification to the source text has been made. The modification to the source text can result in a modified source text. Changed text, that are portions of the modified source text that are not modified relative to the source text, can be identified in the modified source text. Portions of the modified translated text that correspond to the unchanged text of the modified source text can be identified. A machine translation of the modified source text can be received from the machine translation system. Portions of the machine translation of the modified source text, that correspond to the unchanged text in the modified source text, can be replaced with the portions of the modified translated text that correspond to the unchanged text of the modified source text. The modified translated text can be stored as a first version of translated text and a modification of the modified translated text can be stored as an updated version, respectively, of source text translations. The updated version is provided as the translation of the source text to subsequent users. Input indicating that the updated version is not an acceptable translation of the source text can be received. The first version can be provided as the translation of the source text to subsequent users instead of the modified translated text. The modified translated text can be included in a resource. The resource, that a search engine can crawl, can be stored. With the resource, metadata linking the resource to the source resource, can be included. In a user interface, a target resource that includes the machine-translated text can be presented to multiple users. A selection of a portion of the machine-translated text provided in the resource can be detected. An editable version of the selected portion of the machine-translated text can be presented in the user interface, in response to detecting the selection. The source text can be included in a resource identified by a source identifier. An identifier to identify the resource can be provided. The identifier can included a portion of the source identifier. The identifier can identify the target language. The modification can include an addition of text to, or a deletion of text from, the machine-translated text. The modification can be rejected if a difference between a number of words in the machine-translated text and a number of words in the modified translated text fails to satisfy a respective threshold. The threshold can be a number of words or can represent a ratio of numbers of words.

Another innovative aspect of the subject matter described in this specification can be implemented as a computer-implemented method performed by a computer system including one or more computers. Machine-translated text in a target language can be received as a translation of source text. The machine-translated text is a machine translation, by a machine translation system, of the source text from a source language to the target language. A modification of the received machine-translated text is provided. The modification results in a modified translated text. The modification includes at least one of an addition of text in the target language to the machine-translated text, a deletion of a portion of the machine-translated text, or a re-arrangement of portions of the machine-translated text. After the modified translated text is determined, using the machine translation system, to be an acceptable translation of the source text, the modified translated text is received as a translation.

This, and other aspects, can include one or more of the following features. Further modified text that results from another modification of the modified translated text can be received. The other modification can include at least one of an addition of text in the target language to the modified translated text, a deletion of a portion of the modified translated text, or a re-arrangement of portions of the modified translated text. The other modification can be provided by the computer system. The other modification can be provided by another computer system that is different from the computer system. The modified translated text can be received by another computer system that is different from the computer system. The computer system can provide input indicating that the further modified translated text that resulted from the other modification provided by the other computer system is not an acceptable translation of the source text.

Particular implementations of the subject matter described in this specification can be implemented so as to realize one or more of the following advantages. Using the techniques described here, the quality of translated text made available to users can be increased. When text that has been machine-translated into the target language is modified by users who are familiar with the target language, the modified translated text can be a significantly more readable than machine-translated text. Resources that include text that are viewed by many users are more likely to be improved compared to resources that are viewed by few users. The translated text can be included in addressable target resources that users can access using corresponding identifiers. The identifiers can be modified. Doing so can increase user traffic to the resources. The quality of machine-translated text can be improved using input from users who are familiar with the target language. The users who are familiar with the target language will be encouraged to provide input to modify the translated text if the target resource is easily accessible to many such users. In addition, when resources that include text that has been translated into the target language and improved by users familiar with the target language, is added to resources that were originally created in the target language, the quantity of quality content available to users familiar with the target language is increased.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
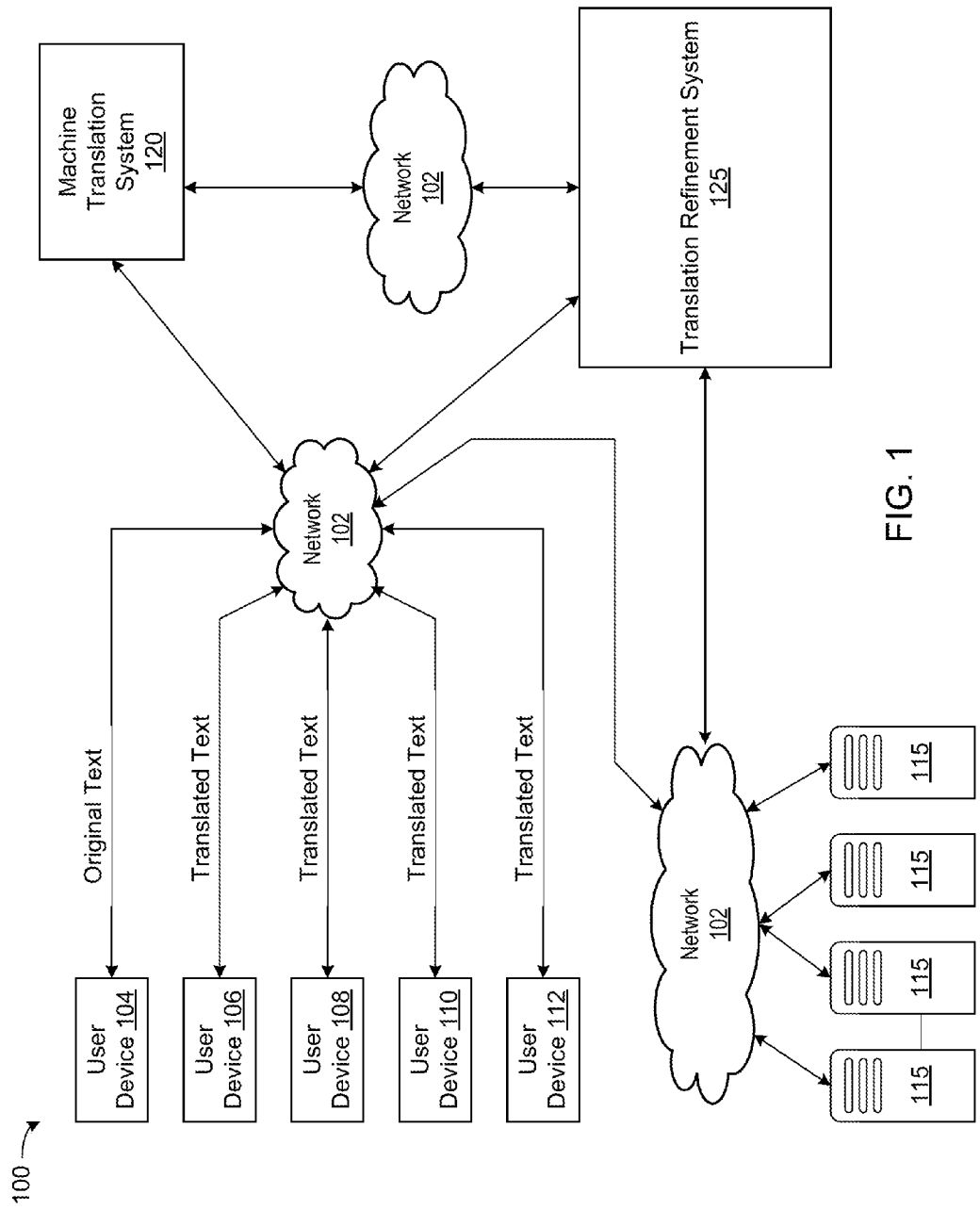
FIG. 1 illustrates an example environment for providing text resources in multiple languages.

FIG. 1 is an example environment 100 for providing text resources in multiple languages. The environment 100 includes multiple components operating in communication with one another over one or more wired or wireless networks 102, for example, the Internet. In the environment 100, multiple user devices, for example, user devices 104, 106, 108, 110, 112, can each communicate with one or more of the multiple hosts 115 (each of which can be one or more data servers) that store resources including text resources. A user of one of the user devices, for example, user device 104 is a publisher who can create and store a source resource, that includes text in a source language, on one or more of the hosts 115 and provide the source resource, for example, as a website for other users to access using other user devices, for example, devices 106, 108, 110, 112, and the like. Some users, for example, users of user devices 106, 108, 110, and 112 may be familiar with a target language rather than the source language in which the publisher created the source resource.

The environment 100 includes a machine translation system 120 that translates source language text into machine-translated target language text. In some implementations, the machine translation system 120 is given permission and can store the translated text as a target resource on one or more of the hosts 115. When a user who is familiar with the target language requests the source resource, the target resource can be provided in response to the request, either instead of the source resource or as a user-selectable alternative.

The environment 100 further includes a translation refinement system 125 that allows users to modify machine-translated target language text, as described with reference to FIG. 2. The translation refinement system 125 can determine that user modifications result in text that is an acceptable translation of the source text, update the translated text, and provide the updated translated text to subsequent users. The translation refinement system 125 can similarly receive and process modifications from the subsequent users to the machine-translated target language text.

Figure 2:
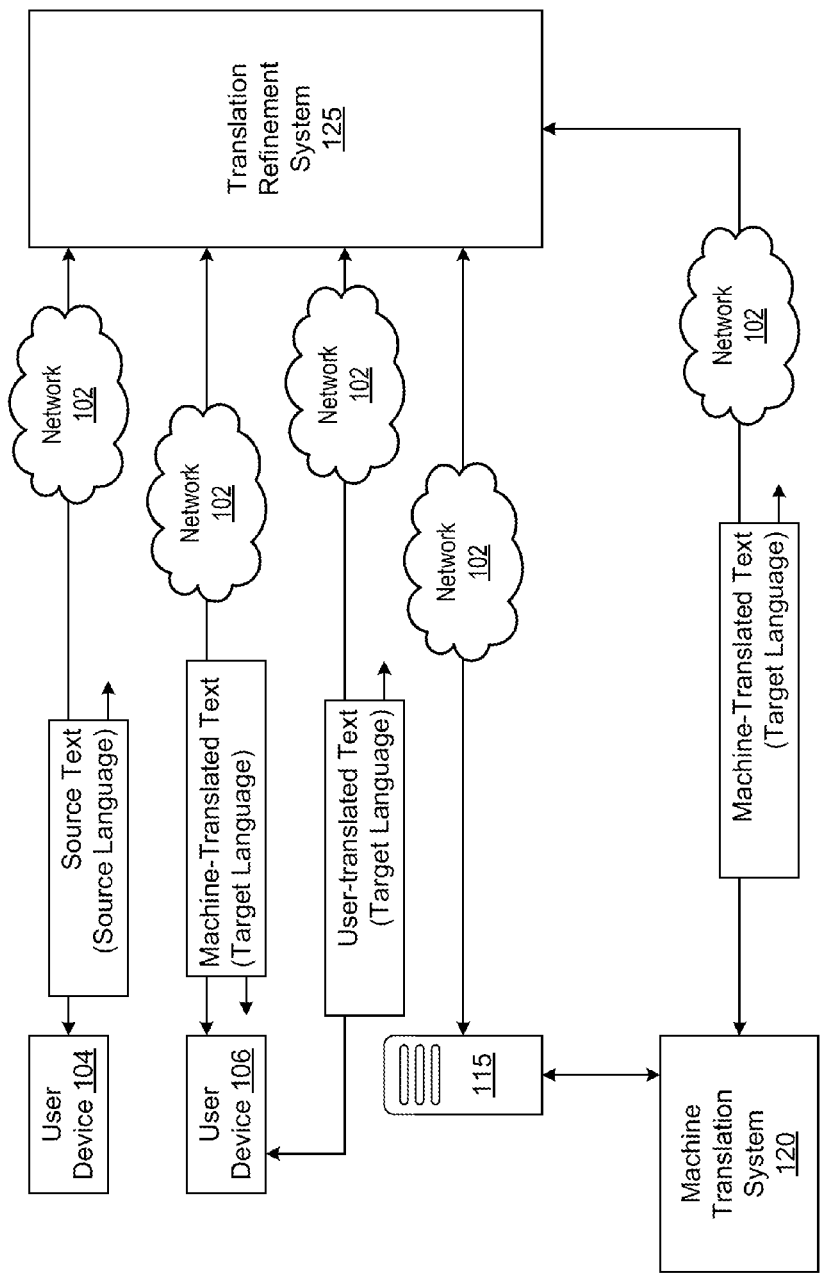
FIG. 2 illustrates an example translation system that provides text resources translated by input from multiple users.

FIG. 2 is an example of a translation refinement system 125 that provides translated text resources with suggested corrections from multiple users. For illustration, the translation refinement system 125 will be described in its interactions with a host 115, two user devices 104 and 106, and a machine translation system 120. A source resource is stored in the host 115. The source resource is addressable over the network 102, using a uniform resource locator (URL), for example.

Further, in some implementations, the machine translation system 120 translates the source language text (for example, English) into text in a target language (for example, Spanish). Additionally, the machine-translated text in the target language can be stored, for example, by the machine translation system 120. For example, the machine translation system 120 can store the text as a target resource. The machine translation system 120 can store the machine-translated text in a location that is addressable over the network 102, which can be a data server that is different from the host 115 that stores the source resource. Alternatively, or in addition, with permission from the host 115, the machine translation system 120 can store the machine-translated text in the host 115. For example, the source resource can include multiple sentences in the source language. The machine translation system 120 translates each of the multiple sentences into the target language and stores the multiple sentences of machine-translated text in the target resource, where it replaces the source language text. Similar to the source resource, the target resource is an addressable resource on the network, for example, by a target resource URL.

The source resource can be provided to user devices in several ways. If the user is viewing the resource, then the user can be provided a variety of tools with which to request a translation. For example, if the user is viewing the resource in a user interface (for example, one presented by a web browser), then a toolbar tool, which makes a request to the translation system, can be included in the user interface. Alternatively, a link to a pre-translated resource can be included in the resource itself. When the user selects the link while viewing the resource, the pre-translated resource can be provided to the user. In some situations, when a search engine determines that the resource satisfies a search query received from a user, the link to the pre-translated resource can be included in the search results along with the link to the source resource itself. Thus, when the search query includes one or more query terms in the source language, search results displayed in response to the search query can include both the link to the source resource and the link to the pre-translated resource. Such search results can also be displayed when the search query includes one or more query terms in the target language (or in the source language and in the target language).

In some scenarios, a user of the user device 106 prefers to be presented with text in the target language rather than in the source language. Consequently, the target resource URL, rather than the source resource URL, can be included as a search result provided to the user device 106. In some implementations, both the source resource URL and the target resource URL can be included as search results provided to the user device 106. As described with reference to FIG. 7, the target resource URL can be selected such that the user of the user device 106 is encouraged to select (or not discouraged from selecting) the target resource URL. Alternatively, the translation refinement system 125 can automatically determine that a user of the user device 106 prefers the target language over the source language. In response to the determination, the translation refinement system 125 can include only the target resource URL in search results provided to the user device 106. When the user of the user device 106 selects the target resource URL, the target resource that includes the machine-translated text in the target language is provided to the user device 106. The machine-translated text can be considered as a zero-th version of translated text. As described below, a subsequent version of translated text (for example, a first version) is generated based on modifications made to the machine-translated text of the zero-th version by users. Similarly, a second version is generated based on modifications made to the first version, and so on.

The machine-translated text in the target resource can be modified by a user of the user device 106. For example, the target resource can be displayed in a user interface in a display device operatively coupled to the user device 106. The target resource can be configured such that one or more of the sentences in the machine-translated text are selectable. To do so, for example, the translation refinement system 125 can encode the target resource using JavaScript such that, when a sentence in the target resource is selected, the machine-translated text in the selected sentence can be edited by a user of the user device. For example, in some implementations, the selected sentence can be displayed in a text box in the user interface adjacent to the selected sentence. The user of the user device 106 can position a cursor within the text box and edit the sentence.

In this manner, the user can modify the machine-translated text. The modification, which results in modified translated text, can include at least one of an addition of text in the target language to the machine-translated text, a deletion of a portion of the machine-translated text, or a re-arrangement of portions of the machine-translated text.

As described later with reference to FIG. 6, whether the modified translated text is an acceptable translation of the source text can be verified. After the verification, the modified translated text can be stored as a first version of translated text. The first version of translated text can be provided to subsequent users who request access to the target resource. One of the subsequent users can further modify the modified translated text. For example, the modified translated text can be included in a resource. The resource can be stored, for example, on a host 115. A search engine can crawl the resource. Metadata that links the stored resource with the resource that includes the source text can be included with the resource, if this is done, when a search engine determines that resource that stores the source text satisfies a search query, the search engine can include the resource that includes the source text and the resource that includes the modified translated text in the search results. The search query can include one or more terms in the source language or in the target language or both.

Figure 3:
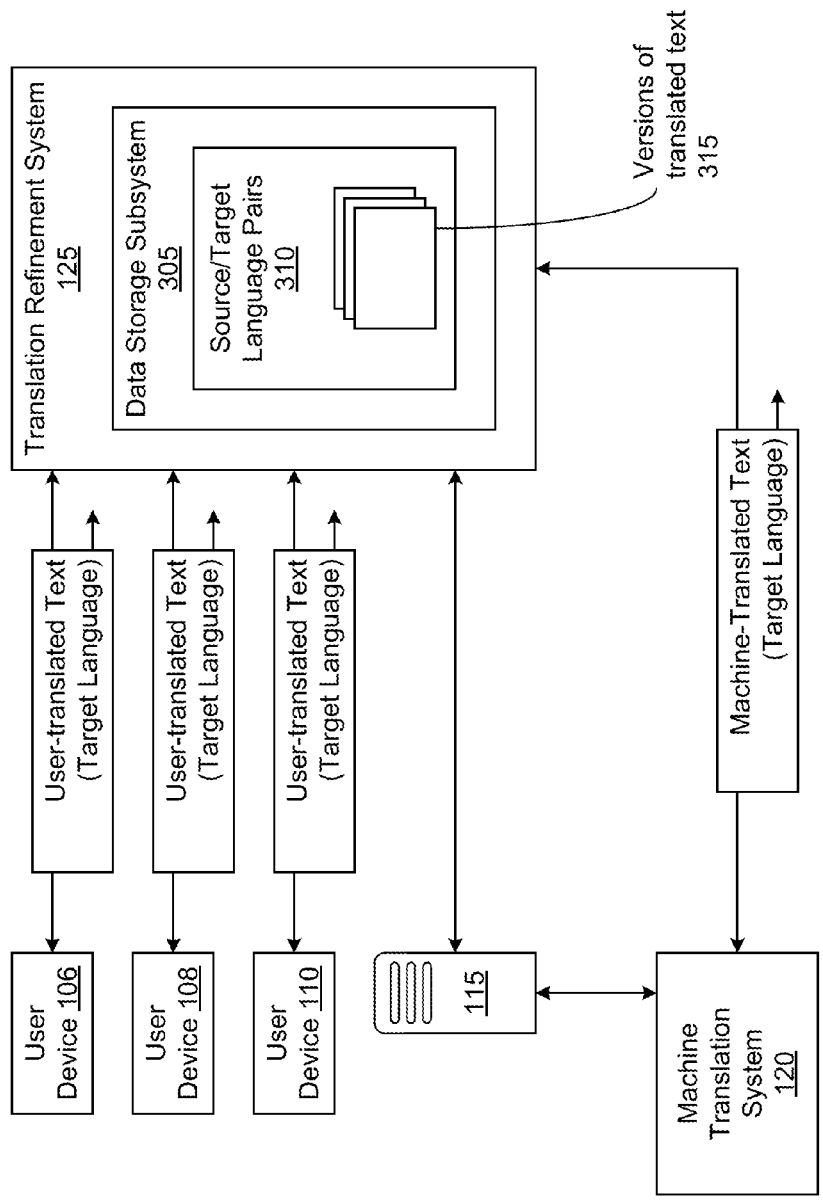
FIG. 3 illustrates an example data storage subsystem in a translation system that stores versions of translated text.

FIG. 3 illustrates an example data storage subsystem 305 in a translation refinement system 125 that stores versions of translated text. Versions of translated text can be created for each instance of modification. The translation refinement system 125 is operatively coupled to multiple user devices (for example, devices 106, 108, 110), a host 115, and a machine translation system 120. Each of the user devices 106, 108, and 110 can be provided with access to the target resource and can input modifications to the translated text.

To generate a machine translation of the text in the source language, the machine translation system 120 translates each sentence in the source resource into a corresponding translated sentence in the target language. The translation refinement system 125 includes a data storage subsystem 305 (which can be a distributed subsystem) that can store the sentence in the source language and the corresponding sentence in the translated language. Thus, the data storage subsystem 305 can store multiple source/target language pairs 310 that represent, for the target resource obtained by machine translation of the source resource, sentences in the source language and corresponding machine-translated sentences in the target language.

When a user of the user device 106 provides input to modify a machine-translated sentence to create a modified translated sentence, the translation refinement system 125 creates and stores a first version of modified translated text in the data storage subsystem 305. To create the first version, in some implementations, the translation refinement system 125 verifies that the modified translated text is an acceptable translation of the source text, as described with reference to FIG. 6. Subsequent to the verification, the translation refinement system 125 replaces the machine-translated sentence in the source/target language pair that includes the machine-translated sentence, with the modified translated sentence. The translation refinement system 125 performs similar replacement for all machine-translated sentences that the user of the user device 106 modifies. The translation refinement system 125 then stores the source/target language pairs that include the modified translated sentences, generated based upon the input from the user of the user device 106, as a first version of versions of translated text 315 in the data storage subsystem 305. The user of the user device 106 may not have modified all of the machine-translated sentences in the target resource. Consequently, the first version of the translated text includes machine-translated text that was originally included in the target resource and modified translated text.

The first version represents an update to the translation of the text in the source resource. In other words, rather than the machine-translated text included in the target resource, the combination of machine-translated text and user modified translated text, that has been verified as being an acceptable translation of the source text, in the first version is a translation of the text in the source resource. When users subsequently request translations of the source resource or request the target resource itself, the translation refinement system 125 provides the first version, rather than the target resource, in response. For example, the first version is displayed in each user device that requests a translation to the target language of the text in the source resource. Through a user interface on each user device, text in the first version can be selected. A user can modify the selected text either in his or her user device or in a server or both. If the user submits the modification to the translated text in the first version, the translation refinement system 125 verifies that the modified translated text is an acceptable translation of the portion of the source document that corresponds to the modified text in the first version, and replaces the translated text in the first version with the modified translated text subsequent to the verification. By doing so, the translation refinement system 125 creates a second version of the translated text that includes machine-translated text that was originally included in the target resource and not modified either in the first version or in the second version, modified translated text from the first version that was not modified by the subsequent user, and modified translated text that was modified by the subsequent user and verified as being acceptable.

In this manner, the data storage subsystem 305 can be used to store multiple versions of translated text 315. Each version is a resource that includes translated text in the target language that has been modified by at least one user. The translation refinement system 125 is configured to provide the most recent version to the users in response to requests for access to translated versions of the source text. The translation refinement system 125 is also configured to revert to a previous version, for example, upon receiving an indication from one or more of the subsequent users that a most recent version is not an acceptable translation of the source text.

The translation refinement system 125 is also configured to change a version upon receiving input from the publisher of the source resource, for example, indicating that any version that the translation refinement system 125 provides is not an acceptable translation of the text in the source resource. For example, the translation refinement system 125 can provide the publisher of the source resource with a view that displays all of the multiple versions of translated text. Such a view can display, to the publisher, the changes that each sentence of the translated text has undergone relative to the machine-translation of the source text. The publisher can then provide input to create a new version of the translated text in which the publisher can discard some (or all) of the previous translations which the publisher does not find acceptable. In some situations, the publisher can periodically request from the translation refinement system 125 a view that displays all of the multiple versions of translated text. In some situations, the translation refinement system 125 can notify the publisher (for example, through a messaging system or electronic mail) each time that that a version of translated text is edited or after a threshold number of edits have been made or both. Alternatively, or in addition, the translation refinement system 125 can notify the publisher when the system 125 creates a threshold number of versions of translated text.

Further, the translation refinement system 125 is configured to update the translated text in the most recent version upon determining that the publisher has updated the source text in the source resource, as described with reference to FIG. 4.

In some implementations, the data storage subsystem 305 can be used to store two (or more) sets of multiple versions of translated text. Each set of versions can include resources that include translated text in a corresponding target language that has been modified by users. For example, if the source resource includes text in English, then the English text can be machine-translated in Spanish and French. The machine-translated Spanish text and the machine-translated French text can be stored as corresponding zero-th versions of translated text. Users can be provided with either or both machine-translated versions. Users can separately provide input to modify the machine-translated Spanish text, based on which versions of translated text in Spanish can be created. The data storage subsystem 305 can be used to store such a created set of multiple versions of Spanish text. Similarly, users can provide input to modify the machine-translated French text based on which versions of translated text in French can be created. The data storage subsystem 305 can be used to also store such a created set of multiple versions of French text. The number of versions of translated text in Spanish need not be the same as the number in French because the number of users who provide input to modify the text in each of the two languages may not be the same.

Figure 4:
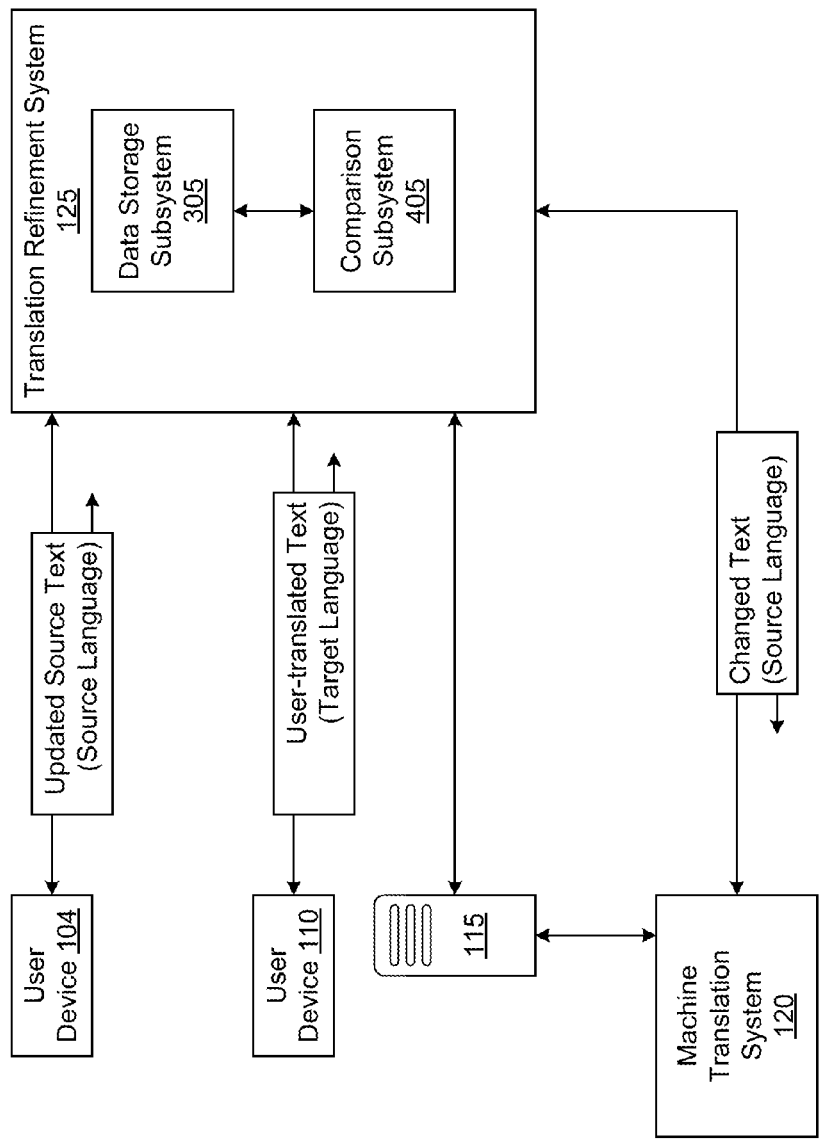
FIG. 4 illustrates an example translation system that obtains a machine translation of updated text in a source resource.

FIG. 4 illustrates an example translation refinement system 125 that obtains a machine translation of updated text in a source resource. In some implementations, the translation refinement system 125 can periodically check if the source resource has been modified. For example, every time that the translation refinement system 125 creates a version of translated text 315, the translation refinement system 125 can check to determine whether the source resource has been modified. The translation refinement system 125 can do so prior to providing the created version to subsequent users. Alternatively, or in addition, the translation refinement system 125 can periodically check the source resource (for example, once a week) to determine whether the source resource has been modified. In some situations, the publisher of the source resource can update the text in the source language in the source resource. For example, the publisher can modify text in the source resource and store the updated text in the host 115 as the source resource. In such situations, the translation refinement system 125 can obtain translations of the updated text, as described below, and replace the text in the target resource with the translations. Subsequently, the translation refinement system 125 can provide the target resource in response to requests for a translation of the source text.

The updated translation can be generated by the machine translation system 120. If the updated text, in its entirety, were machine translated, then the machine translation system 120 will translate portions of the source text that the publisher updated and portions that the publisher did not update. The latter portions will likely be identical to corresponding portions in the target resource as long as the corresponding portions have not been modified based on input from the users. If any of the corresponding portions have been modified by the users and the machine translation of the entirety of the updated text is provided as the target resource, then the modifications by the users will be lost. To avoid such situations, the translation refinement system 125 can generate a target resource that includes portions of text. A first portion corresponds to a machine translation of text in the source resource that the publisher has modified. A second portion is unchanged text that includes modified translated text from the most recent version of the target resource that corresponds to a portion of the source resource that the publisher has not modified. In other words, if original text in the source resource has been modified resulting in updated text and users have modified the translation of the original text resulting in modified translated text, the translation refinement system 125 can retain the modified translated text that resulted from the translation of the original text and discard the machine-translation of corresponding portions of the updated translation. If the original text in the source resource has been modified resulting in updated text or users have not modified the translation of the original text, then the translation refinement system 125 includes the machine-translation of corresponding portions of the updated text.

In some implementations, the translation refinement system 125 includes a comparison module 405 to identify the portions of updated text that correspond to portions of the text in the source language that the publisher has not modified. The translation refinement system 125 provides the text that the publisher has modified to the machine translation system 120. The machine translation system 120 machine-translates the text that the publisher has modified into the target language and provides the translated text to the translation refinement system 125. The translation refinement system 125 then merges the machine-translated text, which is a machine translation of the text that the publisher has modified, with the modified translated text in the target resource that correspond to portions of the text in the source language that the publisher has not modified. To do so, for example, the translation refinement system 125 can replace portions of the machine translation of the modified source text that correspond to the unchanged text in the modified source text with the portions of the modified translated text that correspond to the unchanged text of the modified source text. A process that the translation refinement system 125 executes in such implementations is described with reference to FIG. 5.

Figure 5:
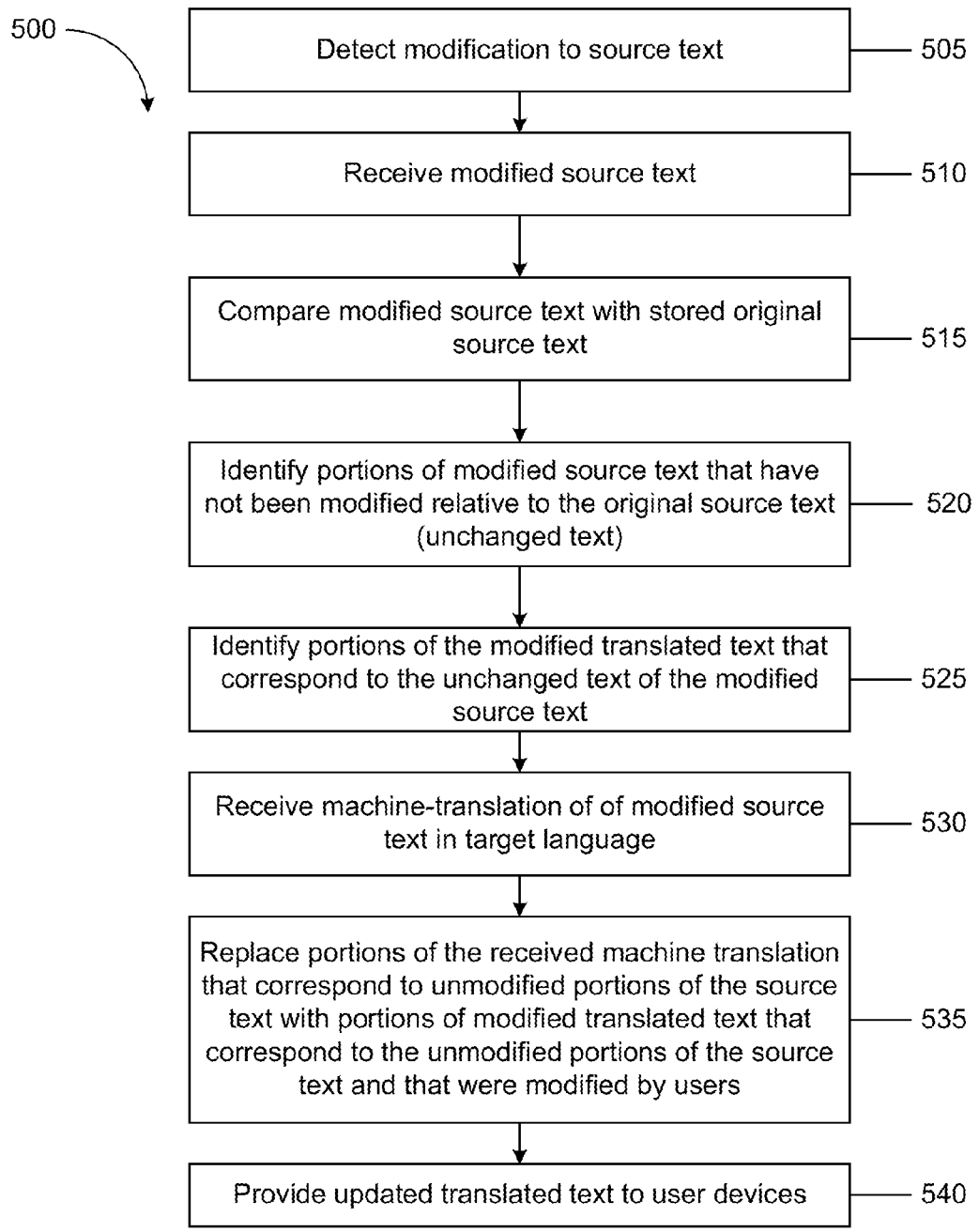
FIG. 5 is a flowchart of an example process for providing translated text to user devices.

FIG. 5 is a flowchart of an example process 500 for providing translated text to user devices. The process 500 can be implemented as a computer program executable by system of one or more computers. The process 500 detects a modification to source text (step 505). The process receives the modified source text (step 510). The process 500 compares the modified source text with stored original source text (step 515). The process 500 identifies unchanged text which are portions of modified source text that have not been modified relative to the original source text (step 520). The process 500 identifies portions of the modified translated text that correspond to the unchanged text of the modified source text (step 525). The process 500 receives a machine translation of the modified source text in the target language (step 530). The process 500 replaces portions of the received machine translation that correspond to unmodified portions of the source text with portions of modified translated text that correspond to the unmodified portions of the source text and that were modified by users (step 535). The process 500 provides the updated translated text to user devices (step 540). Alternatively, or in addition, the updated translated text can be stored and provided later to user devices.

In some implementations, the translation refinement system 125 provides the entirety of the updated text to the machine translation system 120 and receives a machine translation of the entirety in the target language. The translation refinement system 125 replaces portions of the machine translation with portions of the modified translated text in the target resource that correspond to the unchanged text that the comparison module 405 has identified. In other words, if a portion of the source resource has not been modified and the most recent version of the translated resource includes modified translated text that is a result of input from users, then portions of the updated translation generated by the machine translation system 120 that correspond to the unmodified portion of the source resource are discarded, and the modified translated text are retained instead.

The modified translated text may or may not be an acceptable translation of the source text. After detecting a modification to text in the target resource, the translation system 135 can verify that the modified translated text is an acceptable translation of the source text, as described with reference to FIG. 6.

Figure 6:
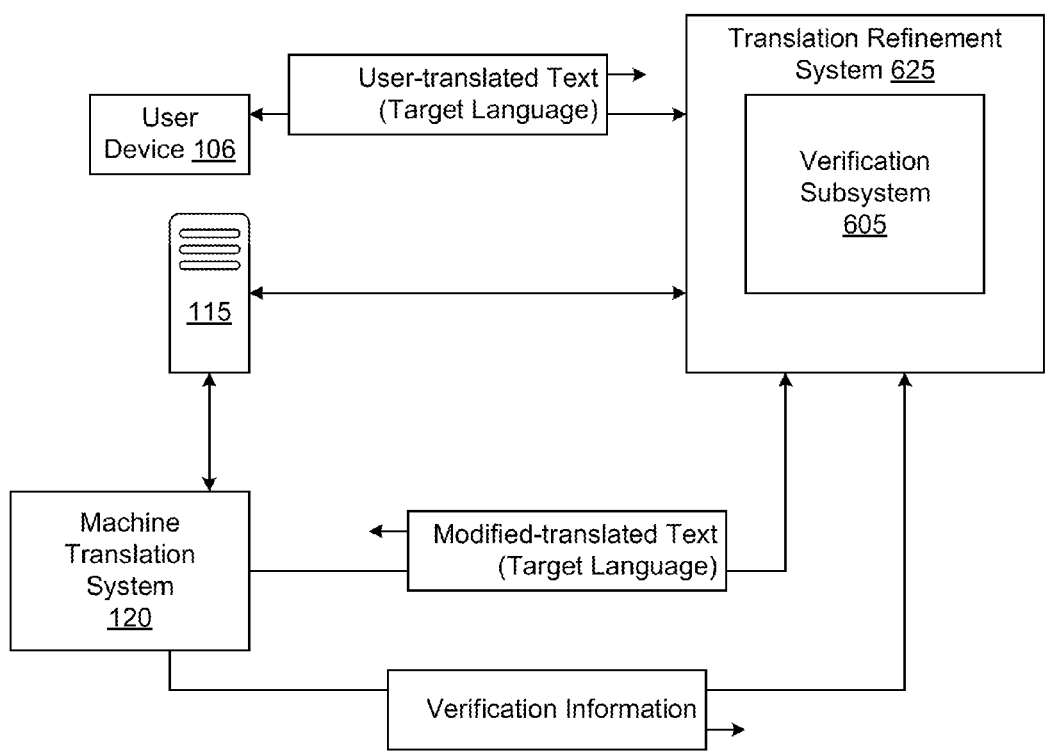
FIG. 6 illustrates an example translation system that verifies translations to text.

FIG. 6 illustrates an example translation refinement system 625 that verifies translations to text. The translation refinement system 625 includes a verification subsystem 605 that determines that a modified translated text is an acceptable translation of the source text. When a user provides input to modify translated text in the target resource, the translation refinement system 625 modifies the text in the target resource based on the input to create the modified translated text. Prior to providing the target resource that includes the modified translated text to subsequent users, the verification subsystem 605 transmits the modified text to the machine translation system 120 to verify the modified translated text.

In some implementations, the verification subsystem 605 transmits the modified translated text to the machine translation system 120. The machine translation system 120 additionally receives the corresponding source text. The machine translation system 120 determines whether the modified translated text is contextually relevant to the source text. For example, if the training data or the statistical model or both of the machine translation system 120 have previously encountered all the words or word/phrases in the modified translated text in the a context of the meaning conveyed by the source text, then the machine translation system 120 can conclude that the modified translated text is an acceptable translation of the source text.

In some implementations, a blacklist including a list of unacceptable word (such as abusive words) can be created and stored. The verification subsystem 605 can determine whether one or more words in the modified translated text are found in the blacklist. If so, then the verification subsystem 605 determines that the modified translated text is not an acceptable translation of the source text. In addition or as an alternative, the verification subsystem 605 can base the verification on the length of the modified translated text. For example, if a difference between a number of words of the modified translated text and a number of words of the source text does not satisfy a threshold, then the verification subsystem 605 can determine that the modified translated text is not an acceptable translation of the source text. In other words, if a modified translated sentence is too long or too short relative to the source sentence, then the modified translated sentence is likely not an acceptable translation of the source sentence.

In some implementations, the machine translation system 120 provides verification information to the translation refinement system 625 indicative of whether or not the modified translated text is an acceptable translation of the source text. For example, the machine translation system can generate multiple candidate translations and a score for each candidate. If the machine translation system 120 determines that the the modified translated text is among the candidates and if the score of the candidate is acceptable, then the machine translation system 120 can conclude that the modified translated text is likely an acceptable translation of the source text.

The translation refinement system 625 can compare the score assigned to the modified translated text and store the modified translated text in the target resource if the score satisfies a threshold. The translation refinement system 625 can then provide the stored resource to subsequent users who request translations of the source resource.

When a user modifies the text in the target resource, the verification subsystem 605 is notified of the modification. As soon as it is notified, the verification subsystem 605 verifies the modified translated text. For example, the translation refinement system 625 determines that a modification to the text has been attempted and notifies the verification subsystem 605 upon making such a determination. If the translation refinement system 625 determines that the verification subsystem 605 has determined that the modified translated text is an acceptable translation of the source text, then it provides the modified translated text in the target resource as soon as the translation refinement system 625 receives notification that the verification subsystem 605 has made such a determination. Thus, subsequent users can see the most recent version of the target resource that reflects up-to-date modified translated text. Further, although the most recent version of the target resource has not yet been crawled by a search engine, when the target resource URL, which is included in search results, is selected, the most recent version of the target resource will be provided to the users who select the target resource URL, although the resource that the user views will be different from the resource that the search engine crawled.

In some implementations, when two users simultaneously modify the translation differently and the verification subsystem 605 determines that both translations are acceptable, the translation refinement system 625 can create a new version based on each of the updates and resolve the simultaneity using a synchronization mechanism. For example, if the translation refinement system 625 has created and stored versions through version 14, and two users provide modifications at effectively the same instant, then the system 625 can make one of the versions version 15 and the other, version 16, based on whichever modification happens to be received or stored first. In other words, one of the versions is arbitrarily selected to be the most recent version of the translated resource. Under this approach, subsequent users will automatically be provided with version 16. A user can view version 15 by retrieving the stored version.

In some other implementations, the translation refinement system 625 can implement a conventional explicit conflict resolution process that is invoked when multiple users create conflicting modifications. In some such implementations, the later user to submit an acceptable modification is asked to resolve whether his or her translation is the better one and should become the most recent and therefore the visible translation. In some implementations, an optimistic conflict resolution is employed, in which the acceptable modifications are merged, and the user submitting the later modification is consulted only if the merge fails because different modifications were made to a unit of text, e.g., to the same sentence or the same paragraph.

In some implementations, the translation refinement system 625 can display modifications to a version as they are made by one user to all other users who are viewing the version. Other users can see the keystrokes being made by the user, and will consequently be able to resolve their editing conflicts in real time.

In some implementations, the translation refinement system 625 can additionally verify the modified translated text based on reliability scores assigned to the users who provide modification input. Because modifications to the target resource by a user are almost immediately shown to subsequent users, the translation refinement system 625 assigns the modifying user a high score if subsequent users do not further modify the modifying user's modifications for a period of time or for a number of views of the target resource. For example, if a first user modified a sentence in the machine-translated text included in the target resource resulting in a modified translated sentence, and if the verification module 605 determined that the modified translated sentence is an acceptable translation of text in the source resource, then the translation refinement system 625 replaces the sentence in the machine-translated text with the modified translated sentence, and provides the target resource with the modified translated sentence to subsequent users. If the target resource is viewed 10,000 times, and if no subsequent user modifies the modified translated sentence in the target resource, then the first user is assigned a high reliability score. Alternatively, if the modified translated sentence is further modified within only the next 50 or 100 times that the target resource is viewed, then the first user is assigned a low reliability score.

The reliability scores assigned to users are used to verify future inputs to modify the text from the users. For example, when a user who has consistently been assigned a low reliability score modifies the text in the target resource, then the inputs can be ignored. Alternatively, for example, when a user who has consistently been assigned a high reliability score modifies the text in the target resource, then the modified translated text can be stored as the target resource and provided to subsequent users without verification by the verification module 605. In some situations, the users with high reliability scores can be requested to validate contributions of users with low reliability scores to determine whether the inputs from the latter users should be accepted or ignored. The validation input or inputs from the reliable users can be used as to determine how the inputs from the latter users are treated, or, alternatively, the validation input or inputs can be used as components in a multiple factor analysis that determines whether the inputs from the latter users should be accepted or ignored.

In some implementations, the translation refinement system 625 is configured to receive input from the publisher of the source resource indicating that the modified translated text in the target resource is not an acceptable translation of the source text. In such implementations, the translation refinement system 625 replaces the current version of the target resource with the previous version. The publisher can continue to provide similar input until the previous version is the version that includes machine-translated text received from the machine translation system 120.

In some implementations, the translation refinement system 625 is configured to receive input from the publisher to modify translated text in the target resource resulting in modified translated text. Because the input is received from the publisher of the source resource, the translation refinement system 125 need not verify that the modified translated text is an acceptable translation of the source text. Rather, the translation refinement system 625 modifies the translated text in response to the publisher input.

Using the techniques described above, input from users conversant in a target language can be used to improve machine translations by a machine translation system 120. The improved target text and the corresponding source text can then be included in the machine translation system 120 to improve the statistical model based on which the machine translation system 120 machine-translates source text, thereby improving the translation capability of the system 120. Further, the translation refinement system 125 can track a number of times the target resource was viewed, a number of times input was received to modify the translated text in the target resource, types of edits, for example, word addition, word deletion, word re-arrangement, and the like, and provide the publisher with a summary report describing the tracked information.

Figure 7:
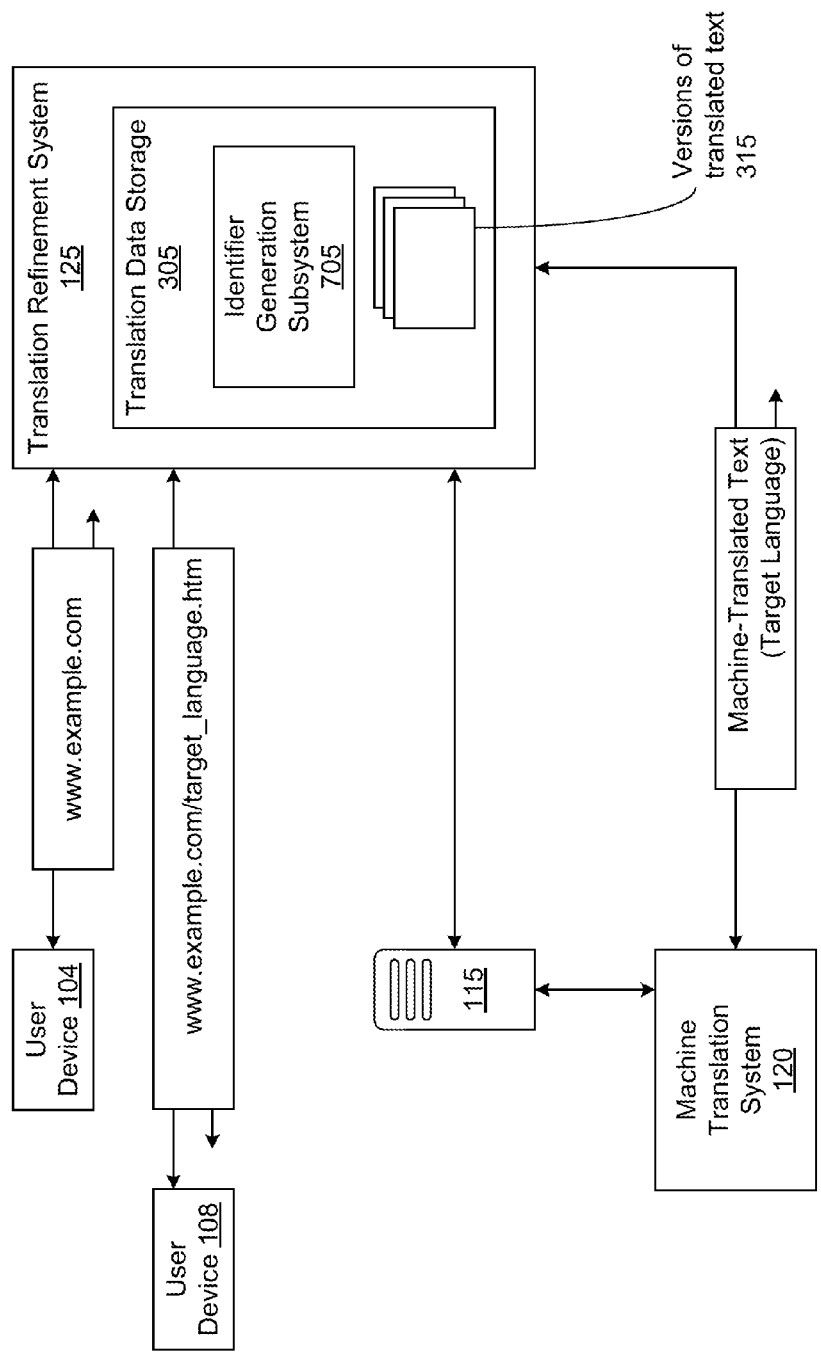
FIG. 7 illustrates an example translation system that generates identifiers for resources that include translated text.

FIG. 7 illustrates an example translation refinement system 125 that generates identifiers for resources that include translated text. The machine translation system 120 is configured to translate a source text into multiple target languages. The translation refinement system 125 is configured to store the machine translated text in each target language in a corresponding resource, and provide each resource to multiple users to receive input to modify the translated text in each resource. To individually address each resource, the translation refinement system 125 includes an identifier generation module 705 that generates a URL for each resource. If the translation refinement system 125 has permission from the publisher, the identifier generation module 705 can generate URL on the publisher's web site and cause the translated resource to be stored there. For example, if the URL of the source resource is www.xyz.com/abc.html, then, for a resource in a target language, the identifier generation module 705 could assign the following URL: www.xyz.com/<target language code>/abc.html.

A translated resource need not be stored by the publisher's data server. Instead, the translated resource can be stored on any host, including one that is independent of the publisher's data server and not even under the publisher's control. In such situations, the URL of the translated resource may have a domain name component that does not match the publisher's web site.

Alternatively, the publisher may create a CNAME (canonical name) record in the Domain Name System (DNS) that points a form of the publisher's domain name to a third-party host domain name that addresses the site of the translated resources. The publisher obtains the form of the actual URL of the translated resources from the translation refinement system 125. For convenience, the translation refinement system 125 can adopt a simple schema, so that the publisher's name "translation.xyz.com" or "french.xyz.com" is mapped to the name "xyz.com.translations.com" or "french.xyz.com.translations.com", for example, which could belong to the translation refinement system 125. In that way, the publisher and others can use a URL that identifies the resource with the publisher.

As a further alternative, knowing that the source resources will be available in translation on a translation host, the publisher can use any convenient form of redirection to redirect publisher URLs of the form www.xyz.com/source/language to translation system URLs of the form www.translations.com/www.xyz.com/source/language, for example.

Figure 8:
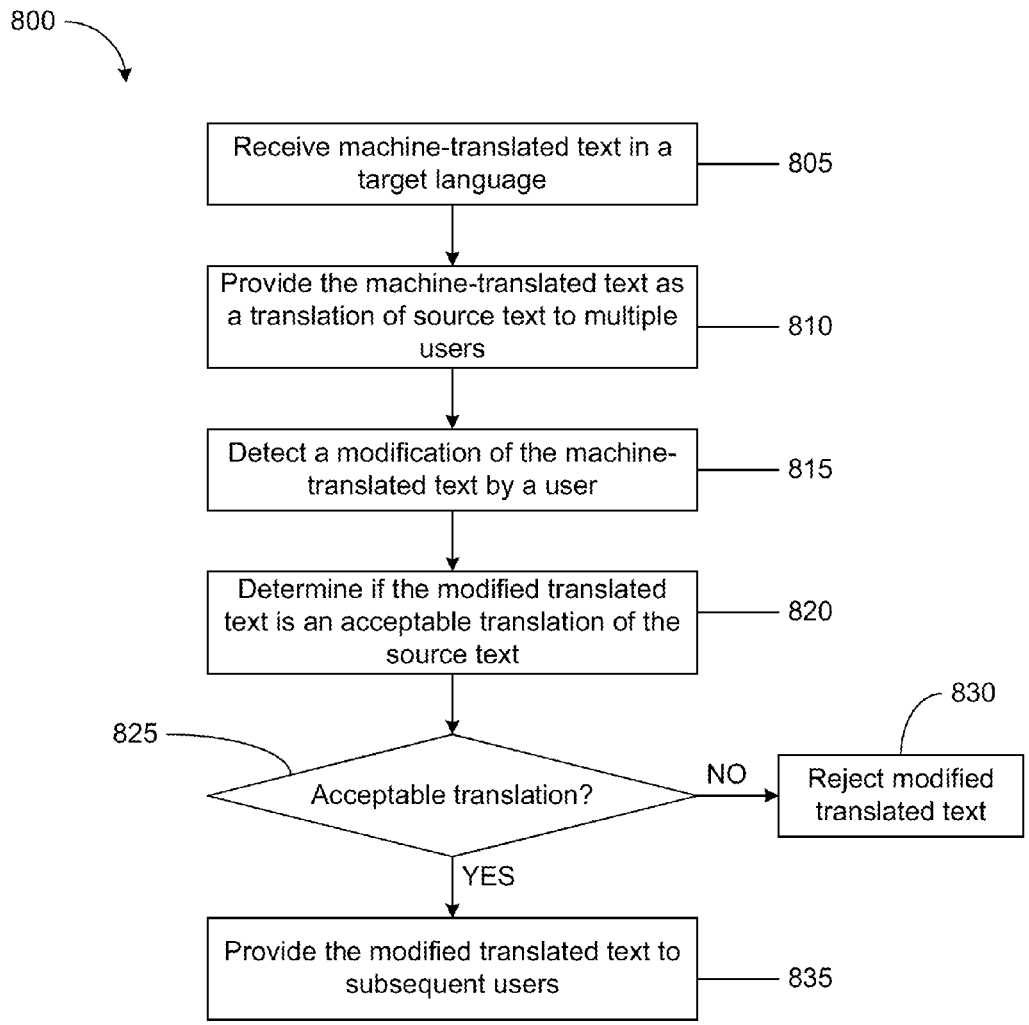
FIG. 8 is a flowchart of an example process for providing modified translated text to users.

FIG. 8 is a flowchart of an example process 800 for providing modified translated text to users. The process 800 can be implemented as a computer program that is stored on a computer-readable medium and is executed by one or more computers. The process 800 receives machine-translated text in a target language (step 805). The process 800 provides the machine-translated text as a translation of source text to multiple users (step 810). The process 800 receives a modification of the machine-translated text made by a user (step 815). The modification results in modified translated text. The process 800 determines whether the modified translated text is an acceptable translation of the source text (step 820). If the modified translated text is not an acceptable translation of the source text ("No" branch of decision step 825), then the process 800 rejects the modified translated text. If the modified translated text is an acceptable translation of the source text ("Yes" branch of decision step 825), then the process 800 adopts the modification and provides the translated text with the modification to subsequent users.

Figure 9:
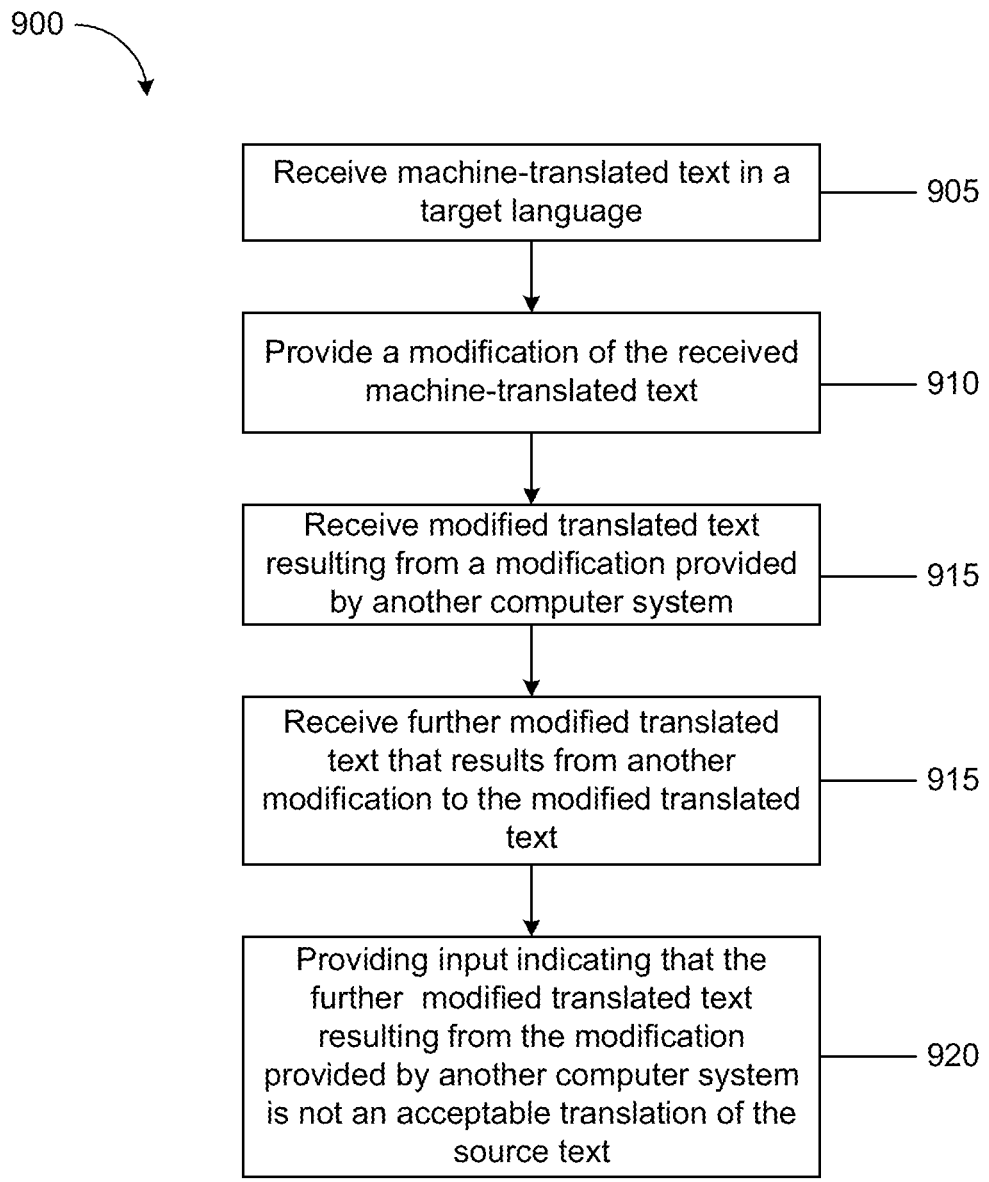
FIG. 9 is a flowchart of an example process for providing modifications to machine-translated text.

FIG. 9 is a flowchart of an example process 900 for providing modifications to machine-translated text. The process 900 can be implemented as a computer program that is stored on a computer-readable medium and is executed by one or more computers. The process 900 receives machine-translated text in a target language (step 905). The machine-translated text is a translation of source text, and is a machine translation, by a machine translation system, of the source text from a source language to the target language. The process 900 provides a modification of the received machine-translated text (step 910). The modification results in a modified translated text. The process 900 receives the modified translated text as a translation of the source text after the modified translated text is determined, using the machine translation system, to be an acceptable translation of the source text (step 915). The process 900 receives further modified translated text that results from another modification to the modified translated text (step 920). If the other modification is provided by another computer system, and if it is determined that the further modified translated text resulting from the other modification is not an acceptable translation of the source text, then the process 900 provides input indicating that the modified translated text is not an acceptable translation of source text (step 925).

Embodiments of the subject matter and the functional operations described in this specification can be implemented in digital electronic circuitry, in tangibly-embodied computer software or firmware, in hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, for example, a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, or a combination of one or more of them.

A computer program (which may also be referred to as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a server including one or more processors, machine-translated text in a target language, wherein the machine-translated text is a machine translation, by a machine translation system, of source text from a source language to the target language;
   providing, from the server, the machine-translated text as a translation of the source text to a user;
   detecting, at the server, a modification of the provided machine-translated text by the user, the modification resulting in a modified translated text, wherein the modification includes at least one of an addition of text in the target language to the machine-translated text, a deletion of a portion of the machine-translated text, or a re-arrangement of portions of the machine-translated text;
   determining, at the server and using the machine translation system, that the modified translated text is an acceptable translation of the source text when the machine translation system has encountered words/phrases in the modified translated text in a context of a meaning conveyed by the source text; and
   upon determining that modified translated text is an acceptable translation of the source text, providing, from the server, the modified translated text as the translation of the source text to subsequent users, wherein the modified translated text is modifiable by one or more of the subsequent users.

2. The method of claim 1, wherein determining, using the machine translation system, that the modified translated text is an acceptable translation comprises:
   generating changed text that represents a difference between the machine-translated text and the modified translated text;
   providing the changed text to the machine translation system; and
   obtaining an indication from the machine translation system that the changed text is acceptable relative to the source text.

3. The method of claim 1, further comprising:
   tracking the modified translated text to determine subsequent modifications by a subsequent user to the modification made by the user; and
   associating a reliability score with the user based on the tracking.

4. The method of claim 3, further comprising:
   generating changed text that represents a difference between the machine-translated text and the modified translated text;
   determining that the user from whom the modification was received is associated with a reliability score that is greater than a threshold; and
   providing the changed text to the machine translation system to use as training data.

5. The method of claim 1, further comprising:
   determining that a modification to the source text has been made, wherein the modification to the source text results in a modified source text;
   identifying unchanged text in the modified source text, the unchanged text being portions of the modified source text that are not modified relative to the source text;
   identifying portions of the modified translated text that correspond to the unchanged text of the modified source text;
   receiving a machine translation of the modified source text from the machine translation system; and
   replacing portions of the machine translation of the modified source text that correspond to the unchanged text in the modified source text with the portions of the modified translated text that correspond to the unchanged text of the modified source text.

6. The method of claim 1, further comprising:
   storing the modified translated text as a first version of translated text and a modification of the modified translated text as an updated version, respectively, of source text translations, wherein the updated version is provided as the translation of the source text to subsequent users;
   receiving input indicating that the updated version is not an acceptable translation of the source text; and
   providing the first version as the translation of the source text to subsequent users instead of the modified translated text.

7. The method of claim 1, further comprising:
   including the modified translated text in a resource;
   storing the resource that a search engine can crawl; and
   including with the resource, metadata linking the resource to the source text.

8. The method of claim 1, further comprising:
   presenting, in a user interface, a target resource that includes the machine-translated text to the user;
   detecting a selection of a portion of the machine-translated text provided in the resource; and
   presenting an editable version of the selected portion of the machine-translated text in the user interface, in response to detecting the selection.

9. The method of claim 1, wherein the modification includes an addition of text to, or a deletion of text from, the machine-translated text, the method further comprising:
   rejecting the modification if a difference between a number of words in the machine-translated text and a number of words in the modified translated text fails to satisfy a respective threshold, wherein the threshold is a number of words or represents a ratio of numbers of words.

10. A non-transitory computer-readable medium storing computer program instructions executable by a server to perform operations comprising:
- receiving machine-translated text in a target language, wherein the machine-translated text is a machine translation, by a machine translation system, of source text from a source language to the target language;
- providing the machine-translated text as a translation of the source text to a user;
- detecting a modification of the provided machine-translated text by the user, the modification resulting in a modified translated text, wherein the modification includes at least one of an addition of text in the target language to the machine-translated text, a deletion of a portion of the machine-translated text, or a re-arrangement of portions of the machine-translated text;
- determining, using the machine translation system, that the modified translated text is an acceptable translation of the source text when the machine translation system has encountered words/phrases in the modified translated text in a context of a meaning conveyed by the source text; and
- upon determining that modified translated text is an acceptable translation of the source text, providing the modified translated text as the translation of the source text to subsequent users, wherein the modified translated text is modifiable by one or more of the subsequent users.

11. The medium of claim 10, wherein determining, using the machine translation system, that the modified translated text is an acceptable translation comprises:
- generating changed text that represents a difference between the machine-translated text and the modified translated text;
- providing the changed text to the machine translation system; and
- obtaining an indication from the machine translation system that the changed text is acceptable relative to the source text.

12. The medium of claim 10, the operations further comprising:
- tracking the modified translated text to determine subsequent modifications by a subsequent user to the modification made by the user; and
- associating a reliability score with the user based on the tracking.

13. The medium of claim 10, the operations further comprising:
- generating changed text that represents a difference between the machine-translated text and the modified translated text;
- determining that the user from whom the modification was received is associated with a reliability score that is greater than a threshold; and
- providing the changed text to the machine translation system to use as training data.

14. The medium of claim 10, the operations further comprising:
- determining that a modification to the source text has been made, wherein the modification to the source text results in a modified source text;
- identifying unchanged text in the modified source text, the unchanged text being portions of the modified source text that are not modified relative to the source text;
- identifying portions of the modified translated text that correspond to the unchanged text of the modified source text;
- receiving a machine translation of the modified source text from the machine translation system; and
- replacing portions of the machine translation of the modified source text that correspond to the unchanged text in the modified source text with the portions of the modified translated text that correspond to the unchanged text of the modified source text.

15. The medium of claim 10, the operations further comprising:
- storing the modified translated text as a first version of translated text and a modification of the modified translated text as an updated version, respectively, of source text translations, wherein the updated version is provided as the translation of the source text to subsequent users;
- receiving input indicating that the updated version is not an acceptable translation of the source text; and
- providing the first version as the translation of the source text to subsequent users instead of the modified translated text.

16. The medium of claim 10, the operations further comprising:
- including the modified translated text in a resource;
- storing the resource that a search engine can crawl; and
- including with the resource, metadata linking the resource to the source text.

17. The medium of claim 10, the operations further comprising:
- presenting, in a user interface, a target resource that includes the machine-translated text to the user;
- detecting a selection of a portion of the machine-translated text provided in the resource; and
- presenting an editable version of the selected portion of the machine-translated text in the user interface, in response to detecting the selection.

18. The medium of claim 10, wherein the modification includes an addition of text to, or a deletion of text from, the machine-translated text, the method further comprising:
- rejecting the modification if a difference between a number of words in the machine-translated text and a number of words in the modified translated text fails to satisfy a respective threshold, wherein the threshold is a number of words or represents a ratio of numbers of words.

19. A system comprising:
- a server; and
- a computer-readable medium storing computer program instructions executable by the server to perform operations comprising:
    - receiving machine-translated text in a target language, wherein the machine-translated text is a machine translation, by a machine translation system, of source text from a source language to the target language;
    - providing the machine-translated text as a translation of the source text to a user;
    - detecting a modification of the provided machine-translated text by the user, the modification resulting in a modified translated text, wherein the modification includes at least one of an addition of text in the target language to the machine-translated text, a deletion of a portion of the machine-translated text, or a re-arrangement of portions of the machine-translated text;
    - determining, using the machine translation system, that the modified translated text is an acceptable translation of the source text when the machine translation system has encountered words/phrases in the modified translated text in a context of a meaning conveyed by the source text; and upon determining that modified translated text is an acceptable translation of the source text, providing the modified translated text as the translation of the source text to subsequent users, wherein the modified translated text is modifiable by one or more of the subsequent users.

20. The system of claim 19, wherein determining, using the machine translation system, that the modified translated text is an acceptable translation comprises:

generating changed text that represents a difference between the machine-translated text and the modified translated text;

providing the changed text to the machine translation system; and obtaining an indication from the machine translation system that the changed text is acceptable relative to the source text.

21. The system of claim 19, the operations further comprising:

tracking the modified translated text to determine subsequent modifications by a subsequent user to the modification made by the user; and associating a reliability score with the user based on the tracking.

22. The system of claim 21, the operations further comprising:

generating changed text that represents a difference between the machine-translated text and the modified translated text;

determining that the user from whom the modification was received is associated with a reliability score that is greater than a threshold; and providing the changed text to the machine translation system to use as training data.

23. The system of claim 19, the operations further comprising:

determining that a modification to the source text has been made, wherein the modification to the source text results in a modified source text;

identifying unchanged text in the modified source text, the unchanged text being portions of the modified source text that are not modified relative to the source text;

identifying portions of the modified translated text that correspond to the unchanged text of the modified source text;

receiving a machine translation of the modified source text from the machine translation system; and replacing portions of the machine translation of the modified source text that correspond to the unchanged text in the modified source text with the portions of the modified translated text that correspond to the unchanged text of the modified source text.

24. The system of claim 19, the operations further comprising:

storing the modified translated text as a first version of translated text and a modification of the modified translated text as an updated version, respectively, of source text translations, wherein the updated version is provided as the translation of the source text to subsequent users;

receiving input indicating that the updated version is not an acceptable translation of the source text; and providing the first version as the translation of the source text to subsequent users instead of the modified translated text.

25. The system of claim 19, the operations further comprising:

including the modified translated text in a resource;

storing the resource that a search engine can crawl; and including with the resource, metadata linking the resource to the source text.

26. The system of claim 19, the operations further comprising:

presenting, in a user interface, a target resource that includes the machine-translated text to the user;

detecting a selection of a portion of the machine-translated text provided in the resource; and presenting an editable version of the selected portion of the machine-translated text in the user interface, in response to detecting the selection.

27. The system of claim 19, wherein the modification includes an addition of text to, or a deletion of text from, the machine-translated text, the method further comprising:

rejecting the modification if a difference between a number of words in the machine-translated text and a number of words in the modified translated text fails to satisfy a respective threshold, wherein the threshold is a number of words or represents a ratio of numbers of words.

28. A computer-implemented method comprising:

receiving, at a first computing device including one or more processors, machine-translated text in a target language as a translation of source text from a server, wherein the machine-translated text is a machine translation, by a machine translation system, of the source text from a source language to the target language;

providing, from the first computing device, a modification of the received machine-translated text, the modification resulting in a modified translated text, wherein the modification includes at least one of an addition of text in the target language to the machine-translated text, a deletion of a portion of the machine-translated text, or a re-arrangement of portions of the machine-translated text; and receiving, at the first computing device, the modified translated text as a translation of the source text, after the modified translated text is determined, at the server and using the machine translation system, to be an acceptable translation of the source text, wherein the modified translated text is determined to be an acceptable translation of the source text when the machine translation system has encountered words/phrases in the modified translated text in a context of a meaning conveyed by the source text.

29. The method of claim 28, further comprising receiving, at the first computing device, further modified translated text that results from another modification to the modified translated text, wherein the other modification includes at least one of an addition of text in the target language to the modified translated text, a deletion of a portion of the modified translated text, or a re-arrangement of portions of the modified translated text.

30. The method of claim 29, wherein the other modification is provided by the first computing device or by a second computing device that is different than the first computing device.

31. The method of claim 29, further comprising providing, from the first computing device, input indicating that the further modified translated text is not an acceptable translation of the source text.

* * * * *